(12) United States Patent
Holm

(10) Patent No.: US 9,440,672 B2
(45) Date of Patent: Sep. 13, 2016

(54) ELECTRIC POWER STEERING ASSEMBLY

(71) Applicant: TRW Automotive U.S. LLC, Livonia, MI (US)

(72) Inventor: John Holm, Superior Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 580 days.

(21) Appl. No.: 13/803,891

(22) Filed: Mar. 14, 2013

(65) Prior Publication Data

US 2014/0260728 A1    Sep. 18, 2014

(51) Int. Cl.
| | |
|---|---|
| B62D 5/04 | (2006.01) |
| F16C 35/063 | (2006.01) |
| F16C 19/06 | (2006.01) |
| F16H 25/24 | (2006.01) |
| F16H 55/36 | (2006.01) |

(52) U.S. Cl.
CPC ........... B62D 5/0448 (2013.01); F16C 35/063 (2013.01); *F16C 19/06* (2013.01); *F16H 25/24* (2013.01); *F16H 55/36* (2013.01); *Y10T 74/18576* (2015.01)

(58) Field of Classification Search
CPC ..... B26D 5/04; B26D 5/0445; B26D 5/0448
USPC ................. 74/89.23; 180/443, 444
See application file for complete search history.

(56) References Cited

U.S. PATENT DOCUMENTS

| | | | |
|---|---|---|---|
| 6,378,646 B1 | 4/2002 | Bugosh | |
| 6,644,432 B1 | 11/2003 | Yost et al. | |
| 7,055,646 B2 | 6/2006 | Bugosh | |
| 7,293,626 B2 | 11/2007 | Ozsoylu et al. | |
| 8,307,940 B2 | 11/2012 | Bugosh et al. | |
| 8,789,648 B2 * | 7/2014 | Lee | 180/444 |
| 2010/0051378 A1* | 3/2010 | Kurokawa | 180/444 |
| 2014/0302954 A1* | 10/2014 | Ouchi | B62D 5/0424 474/101 |

FOREIGN PATENT DOCUMENTS

| | | | |
|---|---|---|---|
| JP | 2006-27577 | * | 2/2006 |
| JP | 2006232049 A | | 9/2006 |
| JP | 2012126338 A | | 7/2012 |
| JP | 20130006517 A | | 1/2013 |
| KR | 1020110024372 A | | 3/2011 |

OTHER PUBLICATIONS

Notification of Transmittal of the International Search Report, etc. for International Application No. PCT/US2014/021596 dated Jul. 2, 2014.

* cited by examiner

*Primary Examiner* — William C Joyce
(74) *Attorney, Agent, or Firm* — MacMillan, Sobanski & Todd, LLC

(57) ABSTRACT

A rack drive assembly adapted for use in a vehicle electric power steering assembly includes a ball nut assembly having at least a first end portion and an opposite second end portion, a bearing assembly carried by the ball nut assembly for rotatably supporting the ball nut assembly, a pulley assembly configured to be carried by the ball nut assembly, and at least a first spanner nut configured to be carried by the first end portion of the ball nut for securing the bearing assembly on the ball nut assembly. The ball nut includes a flange provided on an outer portion thereof configured to connect the ball nut to a pulley of a pulley assembly for rotation therewith. The flange is spaced remote from an end of the second end portion of the ball nut.

18 Claims, 3 Drawing Sheets

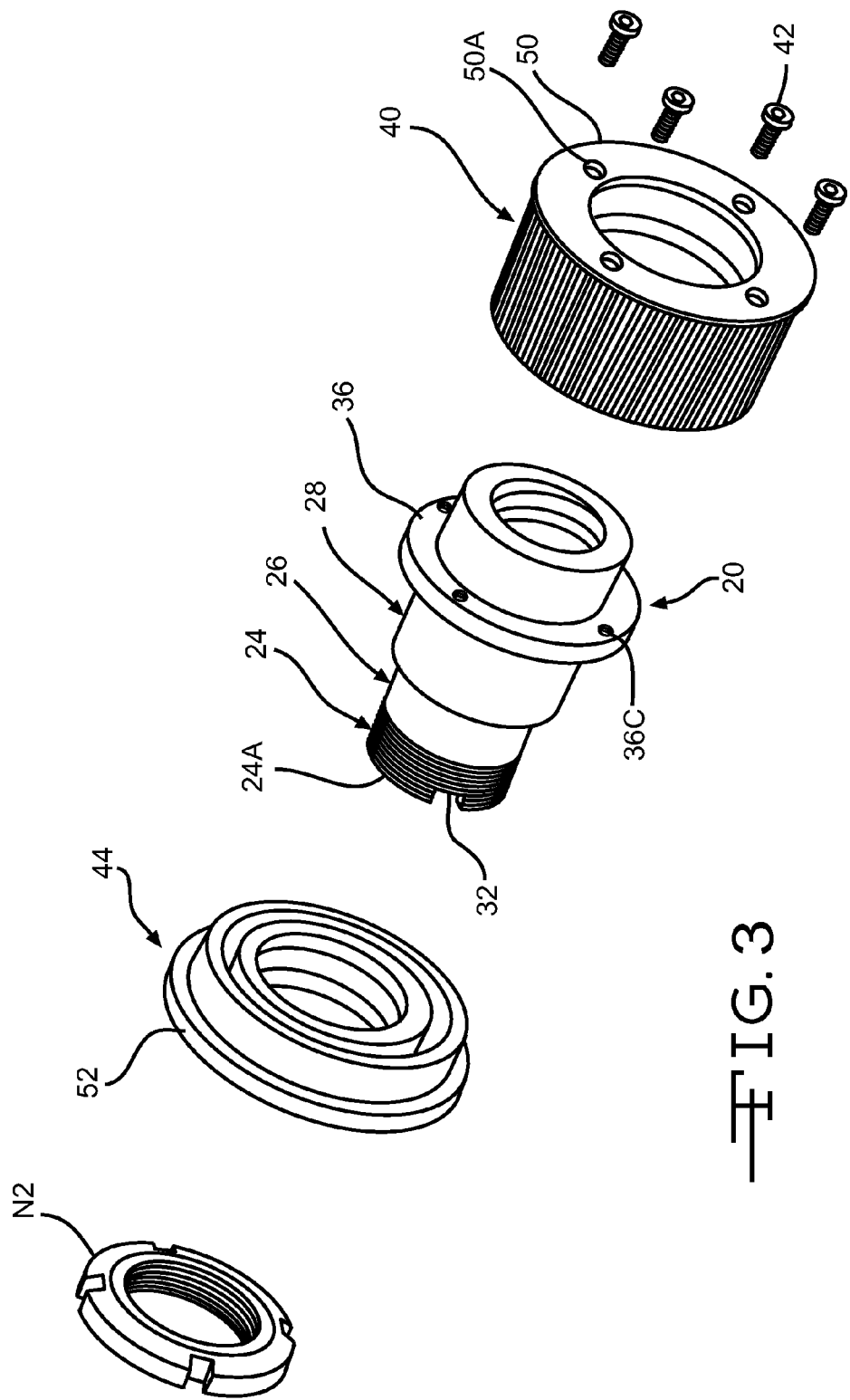

016
ELECTRIC POWER STEERING ASSEMBLY

BACKGROUND OF THE INVENTION

This invention relates in general to vehicle electric power steering assemblies and in particular to an improved rack drive assembly adapted for use in such a vehicle electric power steering assembly.

One known electric power steering assembly for turning steerable wheels of a vehicle includes a ball nut for transmitting force between an axially movable rack member and an electric motor. Upon actuation of the electric motor of the power steering assembly, the ball nut is driven to rotate relative to the rack member. The rotational force of the ball nut is transmitted to the rack member by balls to drive the rack member axially. The axial movement of the rack member by the balls effects turning movement of the steerable wheels.

The electric motor in the above-described electric power steering assembly can be coupled to drive the ball nut in various known methods. One such method includes a belt drive assembly wherein an output shaft of the electric motor is connected via a belt to a pulley assembly. The pulley assembly typically includes a pulley which is operatively fixed to the ball nut so that the ball nut rotates with the pulley when the electric motor is actuated. This type of electric power steering assembly has advantages over other known electric power steering assemblies. However, in this type of electric power steering assembly, one or more disadvantages may be in the overall size, cost, packaging and/or operating characteristics of one or more of the components of the rack drive assembly, in particular of the pulley assembly and/or the ball nut assembly, may not be desirable or optimal.

Thus, it would be desirable to provide an improved structure for a rack drive assembly of an electric power steering assembly which reduces and/or improves upon one or more of the above disadvantages and is relatively simple and inexpensive.

SUMMARY OF THE INVENTION

This invention relates to an improved structure for a rack drive assembly adapted for use in a vehicle electric power steering assembly.

According to one embodiment, the rack drive assembly adapted for use in the vehicle electric power steering assembly may comprise, individually and/or in combination, one or more of the following features: a steering member configured to be disposed in a rack housing and including a rack portion operatively connected to a vehicle steering wheel and a screw portion; a ball nut assembly configured to be operatively connected to the screw portion of the rack portion of the steering member for effecting axial movement of the steering member upon rotation of a vehicle steering wheel, the ball nut assembly including a ball nut having at least a first end portion and an opposite second end portion; a bearing assembly configured to be disposed in the rack housing and carried by the ball nut assembly for rotatably supporting the ball nut assembly relative to the steering member; a pulley assembly configured to be carried by the ball nut assembly; and at least a first spanner nut configured to be carried by the first end portion of the ball nut for securing the bearing assembly on the ball nut assembly; wherein the ball nut includes a flange provided on an outer portion thereof configured to connect the ball nut to a pulley of the pulley assembly for rotation therewith, wherein the flange is spaced remote from an end of the second end portion of the ball nut.

According to this embodiment, the flange includes a plurality of first openings, the pulley includes a plurality of second openings, one of the plurality of first and second openings are threaded and the other one of the plurality of first and second openings are non-threaded through openings, and fasteners extend through the non-threaded openings and are secured in the threaded openings to connect the ball nut to the pulley.

According to this embodiment, the flange includes a plurality of threaded openings, the pulley includes a plurality of non-threaded openings formed therethrough, and fasteners extend through the non-threaded openings and are secured in the threaded openings to connect the ball nut to the pulley.

According to this embodiment, the ball nut is stepped and further includes at least an intermediate body portion disposed between the first end portion and the second end portion, and the intermediate body portion defines a bearing seat for receiving the bearing assembly.

According to this embodiment, the first end portion defines a first outer diameter and includes external threads provided at least along a portion thereof for threadably receiving the at least one spanner nut, the intermediate body portion defines a second outer diameter greater than the first outer diameter and defines a bearing seat for receiving the bearing assembly, and the second end portion defines a third outer diameter which is greater than the second outer diameter.

According to this embodiment, the second end portion is stepped and includes a first portion which defines a first outer diameter and a second portion which defines a second outer diameter, and the flange is disposed on the second end portion between the first portion and the second portion and defines a flange outer diameter which his greater than the first outer diameter.

According to this embodiment, a second spanner nut is further provided, the first spanner nut secured to the ball nut and engages an inner race of the bearing assembly and the second spanner nut secured to the rack housing and engages an outer race of the bearing assembly.

According to this embodiment, the pulley includes a flange provided thereon configured to be secured to the flange of the ball nut by fasteners.

According to another embodiment, the rack drive assembly adapted for use in the electric power steering assembly may comprise, individually and/or in combination, one or more of the following features: a steering member configured to be disposed in a rack housing and including a rack portion operatively connected to a vehicle steering wheel and a screw portion; a ball nut assembly configured to be operatively connected to the screw portion of the rack portion of the steering member for effecting axial movement of the steering member upon rotation of a vehicle steering wheel, the ball nut assembly including a ball nut having at least a first end portion and an opposite second end portion, the first end portion provided with external threads at least along a portion thereof; a bearing assembly configured to be disposed in the rack housing and carried by the ball nut assembly for rotatably supporting the ball nut assembly relative to the steering member; a pulley assembly configured to be carried by the ball nut assembly; at least a first spanner nut configured to be threadably attached to the external threads of the first end portion of the ball nut for securing the bearing assembly on the ball nut assembly; and an electric motor configured to be operatively connected to the ball nut assembly by the pulley assembly; wherein the ball nut includes a flange provided on an outer portion thereof configured to connect the ball nut to a pulley of the pulley assembly for rotation therewith, wherein the flange is spaced remote from an end of the second end portion of the ball nut a predetermined length.

According to this embodiment, the flange includes a plurality of first openings, the pulley includes a plurality of second openings, one of the plurality of first and second openings are threaded and the other one of the plurality of first and second openings are non-threaded through openings, and fasteners extend through the non-threaded openings and are secured in the threaded openings to connect the ball nut to the pulley.

According to this embodiment, the flange includes a plurality of threaded openings, the pulley includes a plurality of non-threaded openings formed therethrough, and fasteners extend through the non-threaded openings and are secured in the threaded openings to connect the ball nut to the pulley.

According to this embodiment, the ball nut is stepped and further includes at least an intermediate body portion disposed between the first end portion and the second end portion, the intermediate body portion defines a bearing seat for receiving the bearing assembly.

According to this embodiment, the first end portion defines a first outer diameter, the intermediate body portion defines a second outer diameter greater than the first outer diameter and defines a bearing seat for receiving the bearing assembly, and the second end portion defines a third outer diameter which is greater than the second outer diameter.

According to this embodiment, the second end portion is stepped and includes a first portion which defines a first outer diameter and a second portion which defines a second outer diameter, and the flange is disposed on the second end portion between the first portion and the second portion and defines a flange outer diameter which is greater than the first outer diameter.

According to this embodiment, a second spanner nut is further provided, the first spanner nut secured to the ball nut and engages an inner race of the bearing assembly and the second spanner nut secured to the rack housing and engages an outer race of the bearing assembly.

According to this embodiment, the pulley includes a flange provided thereon configured to be secured to the flange of the ball nut by fasteners.

According to another embodiment, a ball nut assembly, which may be adapted for use in a rack drive assembly of a vehicle electric power steering assembly, the rack drive assembly including a steering member disposed in a rack housing and having a rack portion operatively connected to a vehicle steering wheel and a screw portion, may comprise, individually and/or in combination, one or more of the following features: a ball nut assembly configured to be operatively connected to the screw portion of the rack portion of the steering member for effecting axial movement of the steering member upon rotation of a vehicle steering wheel, the ball nut assembly including a ball nut having at least a first end portion and an opposite second end portion; a bearing assembly configured to be disposed in the rack housing and carried by the ball nut assembly for rotatably supporting the ball nut assembly relative to the steering member; and at least a first spanner nut configured to be carried by the first end portion of the ball nut for securing the bearing assembly on the ball nut assembly; wherein the ball nut includes a flange provided on an outer portion thereof configured to connect the ball nut to a pulley of a pulley assembly for rotation therewith, wherein the flange is spaced remote from an end of the second end portion of the ball nut a predetermined length.

According to this embodiment, the ball nut is stepped and further includes at least an intermediate body portion disposed between the first end portion and the second end portion, the intermediate body portion defines a bearing seat for receiving the bearing assembly.

According to this embodiment, the first end portion defines a first outer diameter and includes external threads provided at least along a portion thereof for threadably receiving the at least one spanner nut, the intermediate body portion defines a second outer diameter greater than the first outer diameter and defines a bearing seat for receiving the bearing assembly, and the second end portion defines a third outer diameter which is greater than the second outer diameter.

According to this embodiment, the second end portion is stepped and includes a first portion which defines a first outer diameter and a second portion which defines a second outer diameter, and the flange is disposed on the second end portion between the first portion and the second portion and defines a flange outer diameter which is greater than the first outer diameter.

According to this embodiment, a second spanner nut is further provided, the first spanner nut secured to the ball nut and engages an inner race of the bearing assembly and the second spanner nut secured to the rack housing and engages an outer race of the bearing assembly.

Other advantages of this invention will become apparent to those skilled in the art from the following detailed description of the preferred embodiments, when read in light of the accompanying drawings.

BRIEF DESCRIPTION OF THE DRAWINGS

FIG. 3 is an exploded view of selected components of the vehicle electric power steering assembly illustrated in FIGS. 1 and 2.

DETAILED DESCRIPTION OF THE PREFERRED EMBODIMENTS

Figure 1:
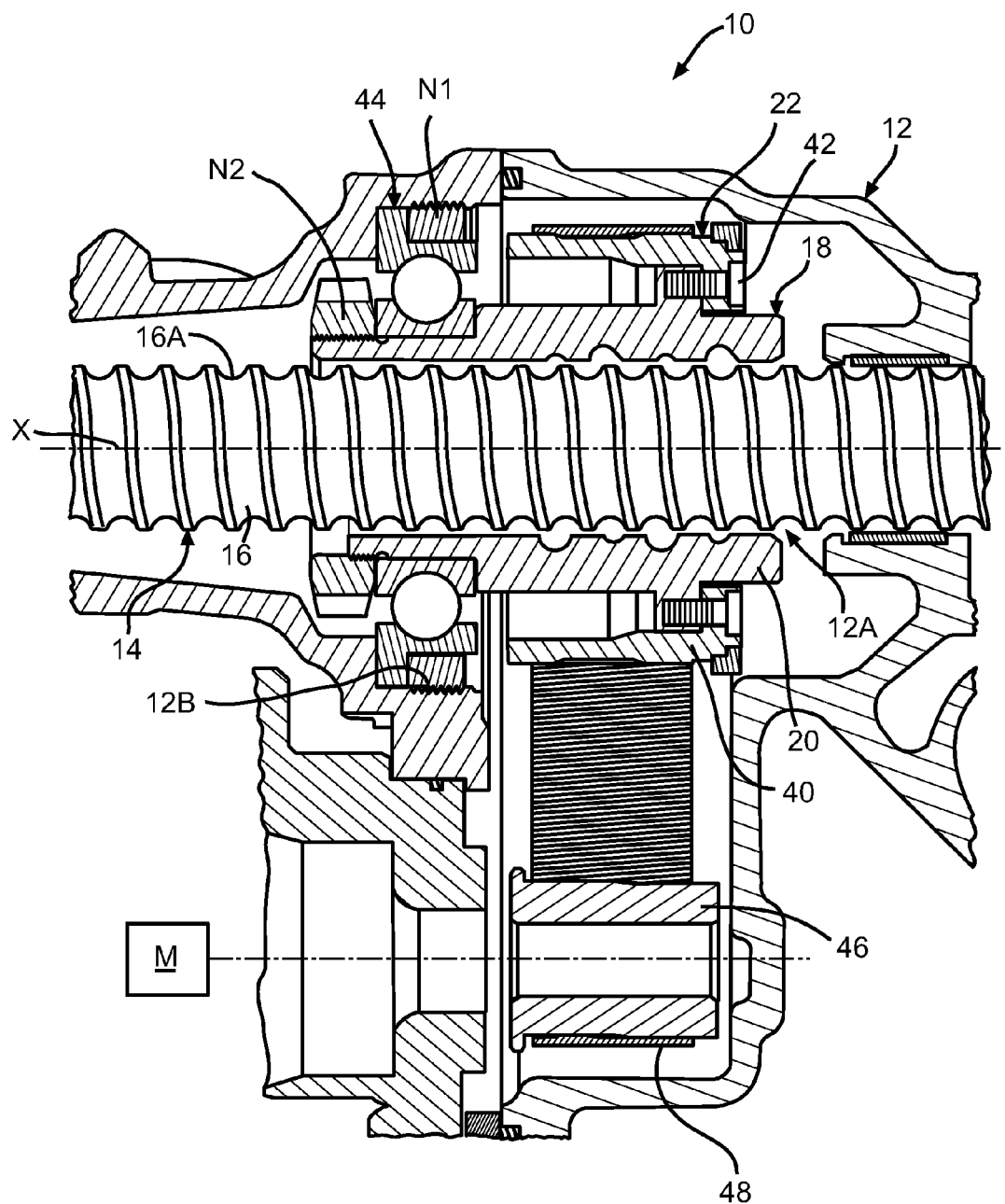
FIG. 1 is a sectional view of a portion of an embodiment of a vehicle electric power steering assembly.

Referring now to FIG. 1, there is illustrated an embodiment of a vehicle electric power steering assembly, indicated generally at 10, constructed in accordance with the present invention. The illustrated vehicle electric power steering assembly 10 is a vehicle electric belt driven rack drive steering assembly and is associated with the front driven wheels (not shown) of the vehicle. The general structure and operation of the electric power steering assembly 10 is conventional in the art. Thus, only those portions of the electric power steering assembly 10 which are necessary for a full understanding of this invention will be explained and illustrated in detail. Also, although this invention will be described and illustrated in connection with the particular electric power steering assembly 10 disclosed herein, it will be appreciated that this invention may be used in connection with other electric power steering assemblies. For example, the invention may be used in connection with other electric power steering assemblies if so desired, such as for example, as shown in U.S. Pat. No. 8,307,940 B2 to Bugosh et al., U.S. Pat. No. 7,055,646 B2 to Bugosh, U.S. Pat. No. 6,644,432 to Yost et al., and U.S. Pat. No. 6,378,646 to Bugosh, the disclosure of each of these patents incorporated by reference in entirety herein.

The illustrated electric power steering assembly 10 includes a rack housing, partially shown and indicated generally at 12, and a steering member, partially shown and indicated generally at 14, disposed therein. The steering member 14 is linearly (or axially) movable along a rack axis X. The steering member 14 includes a rack portion (not shown) which is provided with a series of rack teeth which meshingly engage gear teeth (not shown) provided on a pinion (not shown) which is operatively connected to a steering wheel (not shown) of the vehicle.

In the illustrated embodiment, the steering member 14 further includes a screw portion 16 having an external thread convolution 16A. The steering member 14 is connected with steerable wheels (not shown) of the vehicle through tie rods (not shown) located at the distal ends of the steering member 14. Linear movement of the steering member 14 along the rack axis X results in steering movement of the steerable wheels in a known manner.

The illustrated electric power steering assembly 10 further includes an electric motor (schematically illustrated in FIG. 1 by at M), which as will be discussed below, is drivably connected to a ball nut assembly, indicated generally at 18, for effecting axial movement of the steering member 14 upon rotation of the vehicle steering wheel. In the event of the inability of the electric motor to effect axial movement of the steering member 14, the mechanical connection between gear teeth on the pinion and rack teeth on the rack portion of the steering member 14 permits manual steering of the vehicle.

Figure 2:
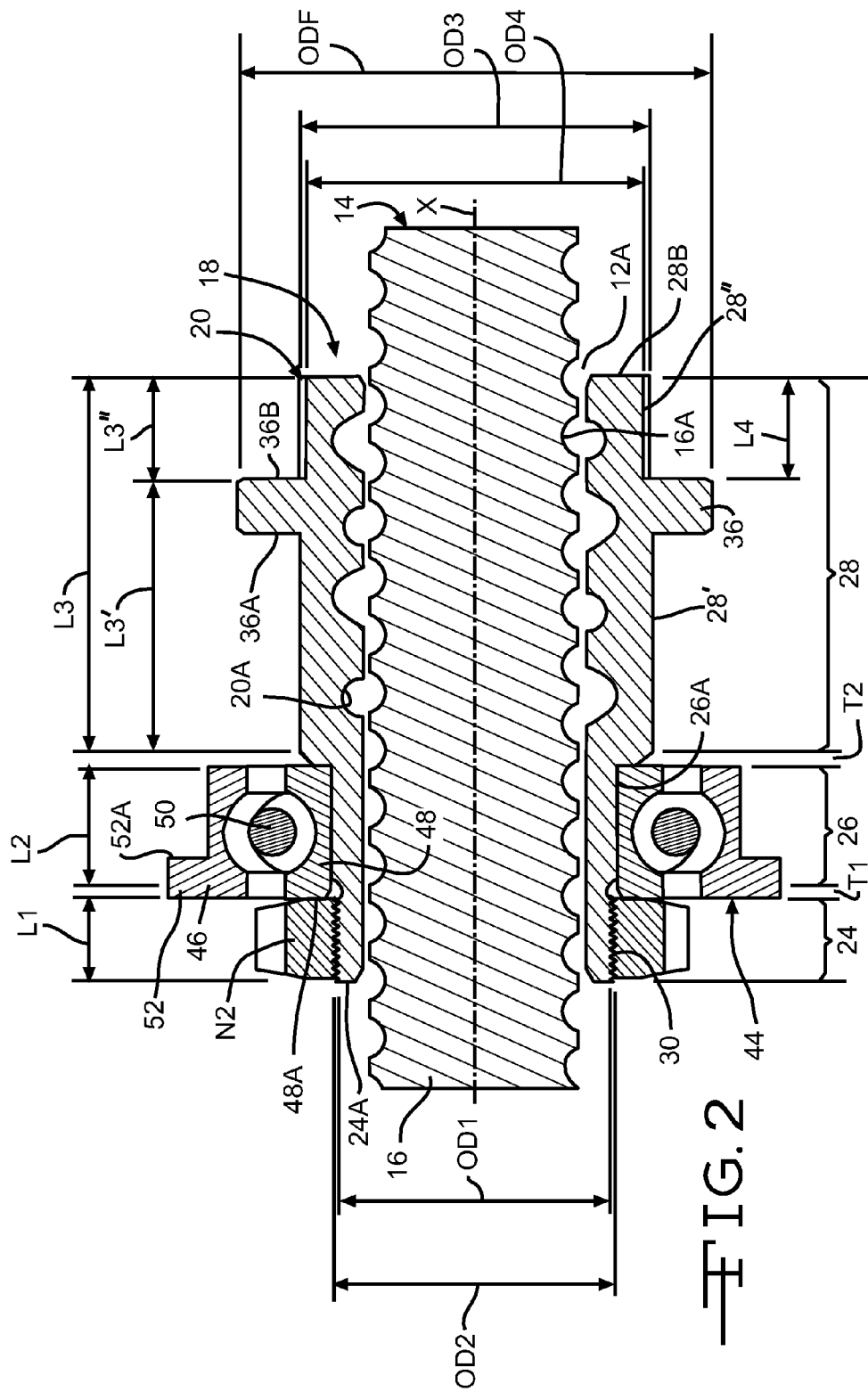
FIG. 2 is an enlarged view of a portion of the vehicle electric power steering assembly illustrated in FIG. 1.

In the illustrated embodiment, the ball nut assembly 18 is located in a chamber 12A of the rack housing 12 and encircles the screw portion 16 of the steering member 14. The ball nut assembly 18 includes a ball nut 20 which is suitably secured to a pulley assembly, indicated generally at 22, for rotation therewith. As best shown in FIG. 2, in the illustrated embodiment, the ball nut 20 is of a stepped configuration and includes a first end portion 24, a first transition portion T1, an intermediate body portion 26, a second transition portion T2, and opposite second end portion 28. The first end portion 24 extends a first axial distance or length L1, defines a first outer diameter OD1 and includes external threads 30 provided along a least a portion thereof extending from a first end 24A toward the opposite end thereof. As best shown in FIG. 3, the first end portion 24 includes a generally U-shaped slot or cut-out 32 provided in the first end 24A thereof. Alternatively, the shape, configuration and/or construction of the first end portion 24 of the ball nut 20 may be other than illustrated and described.

In the illustrated embodiment, the intermediate body portion 26 extends a second length L2 and defines a second outer diameter OD2. The second outer diameter OD2 is greater than the first outer diameter OD1. The intermediate body portion 26 includes an outer surface 26A which defines a bearing seat for a purpose to be discussed below. Alternatively, the shape, configuration and/or construction of the intermediate body portion 26 of the ball nut 20 may be other than illustrated and described.

In the illustrated embodiment, the second end portion 28 extends a third length L3 and is of stepped configuration and includes a first portion 28', a second portion 28", and a flange 36 interposed between the portions 28' and 28". The first portion 28' extends a length L3' and defines a third outer diameter OD3 and the second portion 28" extends a length L3" and defines a fourth outer diameter OD4. In the illustrated embodiment, the third outer diameter OD3 is greater than the second outer diameter OD2 and also greater than the fourth outer diameter OD4 and the length L3' is greater than the length L2 and also greater than the length L3".

In the illustrated embodiment, the second end portion 28 includes the flange 36 which extends radially outwardly therefrom. In the preferred embodiment, the flange 36 is illustrated as being integrally formed on the second end portion 28 of the ball nut 20 during the manufacturing or forming process of the ball nut 20. However, it is to be understood that the flange 36 may be otherwise formed separate from the second end portion 28 and secured thereto by suitable means, such as for example welding, with fasteners, or other suitable securing or fastening means, if so desired. The flange 36 defines a flange outer diameter ODF and includes a first end surface 36A, an opposite second end surface 36B and a plurality of openings 36C formed therein. In the illustrated embodiment, the flange 36 is provided with four of such openings 36C and the openings are threaded openings.

In the illustrated embodiment, the flange 36 is located a predetermined distance L4 remote from or spaced apart from a second end 28B of the second end portion 28 so as to define an intermediate or middle or "non-end" located flange on the ball nut 20. In other words, the flange 36 is not located at the second end 28B of the second end portion 28 but rather is located such that the second end surface 36B of the flange 36 is located the predetermined distance L4 from the second end 28B of the second end portion 28. Alternatively, except for the flange 36 on the second end portion 28 of the ball nut 20 not being located at the second end 28B of the second end portion 28, the shape, configuration and/or construction of the second end portion 28 of the ball nut 20 may be other than illustrated and described. For example, the second end portion 28 does not have to have a stepped construction and include the two different "sized" portions 28' and 28" but can only include, for example, one of the sections 28' or 28" which would extend the entire length L3 and such a construction would include the flange 36 thereon at the length L4 from the end 28A.

In the illustrated embodiment, the ball nut assembly 18 is secured to a pulley 40 of the pulley assembly 22 by a plurality of threaded fasteners 42. In the illustrated embodiment, the pulley 40 may be formed from any suitable type of material, such as for example a phenolic material or other type of a preferably rigid or hard plastic material. However, the pulley 40 may be formed from any other suitable materials plastic and/or metal materials, such as for example aluminum and steel. The fasteners 42 are configured to extend through non-threaded openings 50A provided in an end flange 50 of the pulley 40 and are threadably secured in the threaded openings 36C provided in the flange 36 of the ball nut 20 to thereby secure the ball nut assembly 18 to the pulley assembly 22. Alternatively, the ball nut assembly 18 may be secured to the pulley assembly 22 by other suitable means and/or methods.

The ball nut assembly 18 further includes a plurality of force-transmitting members (not shown). The force transmitting members may comprise balls (not shown), which are disposed between an internal screw thread convolution 20A of the ball nut 20 and the external thread convolution 16A on the screw portion 16 of the steering member 14. The balls are loaded into the ball nut assembly 18 in a known manner. The ball nut assembly 18 further includes a recirculation passage (not shown) for recirculating the balls upon axial movement of the steering member 14 relative to the ball nut assembly 18.

In the illustrated embodiment, the electric power steering assembly 10 further includes a bearing assembly, indicated generally at 44. The illustrated bearing assembly 44 may be any suitable type of bearing assembly, such as for example a four point ball bearing type of bearing assembly. The ball bearing assembly 44 includes an outer race 46, an inner race 48 and balls 50 disposed therebetween. In the illustrated embodiment, the outer race 46 includes a radially outwardly extending flange 52. Alternatively, the particular construction of the bearing assembly 24 may be other than illustrated if so desired.

In the illustrated embodiment, the bearing assembly 44 is disposed on the bearing seat defined by the outer cylindrical surface 26A of the intermediate body portion 26 of the ball nut 20. To accomplish this in the illustrated embodiment, a pair of spanner nuts N1 and N2 are provided. The spanner nut N1 is configured to be screwed onto internal threads 12B provided in a cylindrical inner surface of the housing 12 and engages an end surface 52a of a flange 52 of the outer race 46 of the bearing assembly 44. The spanner nut N2 is configured to be screwed onto the external threads 30 of the first end portion 24 of the ball nut 20 and engages an end surface 48A of the inner race 48 of the bearing assembly 44. During assembly, the spanner nuts N1 and N2 are operative to load the bearing assembly 44 and once assembled the bearing assembly 44 is operative to rotatably support the ball nut 20 of the ball nut assembly 18 relative to the steering member 14. Alternatively, other suitable means and/or methods may be used to retain the bearing assembly 44 and/or to rotatably support the ball nut 20 relative to the steering member 14.

The electric motor M is supported relative to the rack housing 12 by suitable means. The electric motor M includes an output shaft 46 which is connected to a member 48 for rotation therewith. In the illustrated embodiment, the member 48 is a "timing" belt. The timing belt 48 is operatively connected to the pulley assembly 22. Thus, when the electric motor M is actuated via a suitable controller (not shown), the timing belt 48 is rotated via the output shaft 46 so as to rotate the pulley assembly 22. The rotation of the pulley assembly 22 causes the ball nut 22 of the ball nut assembly 20 to be rotated. The rotation of the ball nut 22 results in linear movement of the steering member 14. The balls transmit the rotational force of the ball nut 22 to the rack portion of the steering member 14. Because the ball nut 22 is fixed in position axially, the steering member 14 is driven to move axially in response, effecting steering movement of the steerable wheels of the vehicle.

A potential advantage of the electric power steering assembly 10 is that by locating the flange 36 on the ball nut 20 not at the end 28B of the second end portion 28 but rather at an intermediate location thereon, an overall "axial" dimension or length of the pulley 40 may be reduced as compared to the known or conventional practice wherein the flange of the associated pulley is located at such end and/or also an associated "radial" runout of the pulley 40 may be reduced as compared to the known or conventional practice wherein the flange of the associated pulley is located at such end. In addition, by locating the flange 36 on the ball nut 20 not at the end 28B of the second end portion 28 but rather at an intermediate location thereon may also reduce the ball nut assembly 18 overall weight and/or also the overall ball nut assembly 18 envelope or packaging.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rack drive assembly adapted for use in a vehicle electric power steering assembly comprising:
   a steering member configured to be disposed in a rack housing and including a rack portion operatively connected to a vehicle steering wheel and a screw portion;
   a ball nut assembly configured to be operatively connected to the screw portion of the rack portion of the steering member for effecting axial movement of the steering member upon rotation of a vehicle steering wheel, the ball nut assembly including a one-piece ball nut having only a first end portion, an intermediate body portion and an opposite second end portion;
   a bearing assembly configured to be disposed in the rack housing and carried by the intermediate body portion of the ball nut assembly for rotatably supporting the ball nut assembly relative to the steering member;
   a pulley assembly configured to be carried by the ball nut assembly; and
   a pair of spanner nuts disposed on opposite sides of the bearing assembly, the pair of spanner nuts including a first spanner nut configured to be screwed onto internal threads provided in an inner surface of the rack housing so as to engage an end surface of an outer race of the bearing assembly and a second spanner nut configured to be screwed onto external threads provided on the first end portion of the ball nut so as to engage an oppositely disposed end surface of the inner race of the bearing assembly;
   wherein the ball nut includes a flange provided on an outer portion thereof configured to connect the ball nut to a pulley of the pulley assembly for rotation therewith, wherein the flange is located along a portion of the second end portion of the ball nut and is spaced apart from an end of the second end portion of the ball nut and the intermediate body portion of the ball nut, wherein the flange includes a plurality of openings configured to receive fasteners to connect the ball nut to the pulley.

2. The rack drive assembly according to claim 1 wherein the flange includes a plurality of first openings, the pulley including a plurality of second openings, wherein one of the plurality of first and second openings are threaded and the other one of the plurality of first and second openings are non-threaded through openings, and wherein the fasteners extend through the non-threaded openings and are secured in the threaded openings to connect the ball nut to the pulley.

3. The rack drive assembly according to claim 1 wherein the flange includes a plurality of threaded openings, the pulley including a plurality of non-threaded openings formed therethrough, and wherein the fasteners extend through the non-threaded openings and are secured in the threaded openings to connect the ball nut to the pulley.

4. The rack drive assembly according to claim 1 wherein the ball nut is stepped and further includes at least an intermediate body portion disposed between the first end portion and the second end portion, wherein the intermediate body portion defines a bearing seat for receiving the bearing assembly.

5. The rack drive assembly according to claim 4 wherein the first end portion defines a first outer diameter, wherein the intermediate body portion defines a second outer diameter greater than the first outer diameter and defines a bearing seat for receiving the bearing assembly, and wherein the second end portion defines a third outer diameter which is greater than the second outer diameter.

6. The rack drive assembly according to claim 4 wherein the second end portion is stepped and includes a first portion which defines a first outer diameter and a second portion which defines a second outer diameter, and wherein the flange is disposed on the second end portion between the first portion and the second portion and defines a flange outer diameter which is greater than the first outer diameter.

7. The rack drive assembly according to claim 1 wherein the pulley includes a flange provided thereon configured to be secured to the flange of the ball nut by the fasteners.

8. A rack drive assembly adapted for use in a vehicle electric power steering assembly comprising:
a steering member configured to be disposed in a rack housing and including a rack portion operatively connected to a vehicle steering wheel and a screw portion;
a ball nut assembly configured to be operatively connected to the screw portion of the rack portion of the steering member for effecting axial movement of the steering member upon rotation of a vehicle steering wheel, the ball nut assembly including a one-piece ball nut having only a first end portion, an intermediate body portion and an opposite second end portion, the first end portion provided with external threads at least along a portion thereof;
a bearing assembly configured to be disposed in the rack housing and carried by the intermediate body portion of the ball nut assembly for rotatably supporting the ball nut assembly relative to the steering member;
a pulley assembly configured to be carried by the ball nut assembly;
a pair of spanner nuts disposed on opposite sides of the bearing assembly, the pair of spanner nuts including a first spanner nut configured to be screwed onto internal threads provided in an inner surface of the rack housing so as to engage an end surface of an outer race of the bearing assembly and a second spanner nut configured to be screwed onto the external threads provided on the first end portion of the ball nut so as to engage an oppositely disposed end surface of the inner race of the bearing assembly; and
an electric motor configured to be operatively connected to the ball nut assembly by the pulley assembly;
wherein the ball nut includes a flange provided on an outer portion thereof configured to connect the ball nut to a pulley of the pulley assembly for rotation therewith, wherein the flange is located along a portion of the second end portion of the ball nut and is spaced apart from an end of the second end portion of the ball nut and the intermediate body portion of the ball nut, wherein the flange includes a plurality of openings configured to receive fasteners to connect the ball nut to the pulley.

9. The rack drive assembly according to claim 8 wherein the flange includes a plurality of first openings, the pulley including a plurality of second openings, wherein one of the plurality of first and second openings are threaded and the other one of the plurality of first and second openings are non-threaded through openings, and wherein the fasteners extend through the non-threaded openings and are secured in the threaded openings to connect the ball nut to the pulley.

10. The rack drive assembly according to claim 8 wherein the flange includes a plurality of threaded openings, the pulley including a plurality of non-threaded openings formed therethrough, and wherein the fasteners extend through the non-threaded openings and are secured in the threaded openings to connect the ball nut to the pulley.

11. The rack drive assembly according to claim 8 wherein the ball nut is stepped and further includes at least an intermediate body portion disposed between the first end portion and the second end portion, wherein the intermediate body portion defines a bearing seat for receiving the bearing assembly.

12. The rack drive assembly according to claim 11 wherein the first end portion defines a first outer diameter, wherein the intermediate body portion defines a second outer diameter greater than the first outer diameter and defines a bearing seat for receiving the bearing assembly, and wherein the second end portion defines a third outer diameter which is greater than the second outer diameter.

13. The rack drive assembly according to claim 11 wherein the second end portion is stepped and includes a first portion which defines a first outer diameter and a second portion which defines a second outer diameter, and wherein the flange is disposed on the second end portion between the first portion and the second portion and defines a flange outer diameter which is greater than the first outer diameter.

14. The rack drive assembly according to claim 8 wherein the pulley includes a flange provided thereon configured to be secured to the flange of the ball nut by the fasteners.

15. A ball nut assembly adapted for use in a rack drive assembly of a vehicle electric power steering assembly, the rack drive assembly including a steering member disposed in a rack housing and having a rack portion operatively connected to a vehicle steering wheel and a screw portion, the ball nut assembly comprising:
a ball nut assembly configured to be operatively connected to the screw portion of the rack portion of the steering member for effecting axial movement of the steering member upon rotation of a vehicle steering wheel, the ball nut assembly including a one-piece ball nut having only a first end portion, an intermediate body portion and an opposite second end portion;
a bearing assembly configured to be disposed in the rack housing and carried by the intermediate body portion of the ball nut assembly for rotatably supporting the ball nut assembly relative to the steering member; and
a pair of spanner nuts disposed on opposite sides of the bearing assembly, the pair of spanner nuts including a first spanner nut configured to be screwed onto internal threads provided in an inner surface of the rack housing so as to engage an end surface of an outer race of the bearing assembly and a second spanner nut configured to be screwed onto external threads provided on the first end portion of the ball nut so as to engage an oppositely disposed end surface of the inner race of the bearing assembly;
wherein the ball nut includes a flange provided on an outer portion thereof configured to connect the ball nut to a pulley of the pulley assembly for rotation therewith, wherein the flange is located along a portion of the second end portion of the ball nut and is spaced apart from an end of the second end portion of the ball nut and the intermediate body portion of the ball nut, wherein the flange includes a plurality of openings configured to receive fasteners to connect the ball nut to the pulley.

16. The ball nut according to claim 15 wherein the ball nut is stepped and further includes at least an intermediate body portion disposed between the first end portion and the second end portion, wherein the intermediate body portion defines a bearing seat for receiving the bearing assembly.

17. The rack drive assembly according to claim 16 wherein the first end portion defines a first outer, wherein the intermediate body portion defines a second outer diameter greater than the first outer diameter and defines a bearing seat for receiving the bearing assembly, and wherein the second end portion defines a third outer diameter which is greater than the second outer diameter.

18. The rack drive assembly according to claim 16 wherein the second end portion is stepped and includes a first portion which defines a first outer diameter and a second portion which defines a second outer diameter, and wherein the flange is disposed on the second end portion between the first portion and the second portion and defines a flange outer diameter which is greater than the first outer diameter.

* * * * *